United States Patent [19]

Corbett

[11] Patent Number: 4,744,534
[45] Date of Patent: May 17, 1988

[54] UNFURLABLE MEMBER FOR INCREASING WING SURFACE AREA

[75] Inventor: Marshall J. Corbett, East Northport, N.Y.

[73] Assignee: Grumman Aerospace Corporation, Bethpage, N.Y.

[21] Appl. No.: 826,514

[22] Filed: Feb. 5, 1986

[51] Int. Cl.[4] .............................................. B64C 3/54
[52] U.S. Cl. ....................................... 244/218; 244/46
[58] Field of Search ................. 244/218, 213, 215, 46, 244/49

[56] References Cited

U.S. PATENT DOCUMENTS

| | | |
|---|---|---|
| 1,427,257 | 8/1922 | Bowen et al. . |
| 1,730,249 | 10/1929 | Smith . |
| 2,075,788 | 4/1937 | Adams ................................ 244/218 |
| 2,137,047 | 11/1938 | Gliwa . |
| 2,376,636 | 5/1945 | Thompson . |
| 2,810,985 | 10/1957 | Bilder . |
| 3,092,355 | 6/1963 | Brown . |
| 3,130,944 | 4/1964 | Creasey, et al. . |
| 3,135,482 | 6/1964 | Girard . |
| 3,288,400 | 11/1966 | Nazir .................................... 244/216 |
| 4,090,684 | 5/1978 | Look et al. . |
| 4,106,727 | 8/1978 | Ortell . |
| 4,460,138 | 7/1984 | Sankrithi ............................ 244/218 |

FOREIGN PATENT DOCUMENTS

| | | |
|---|---|---|
| 1272133 | 7/1968 | Fed. Rep. of Germany ...... 244/218 |
| 737052 | 12/1932 | France . |
| 567715 | 10/1957 | Italy .................................... 244/218 |
| 745281 | 2/1956 | United Kingdom ................ 244/218 |
| 1405739 | 9/1975 | United Kingdom ................ 244/218 |

Primary Examiner—Galen Barefoot
Attorney, Agent, or Firm—Pollock, Vande Sande & Priddy

[57] ABSTRACT

An unfurlable sheet is normally stored within a hollowed fillet existing between the fuselage of an aircraft and a confronting edge of the aircraft wing. When the surface area of the wing is to be increased, the sheet is unfurled so that it becomes coplanar with the edge of the wing and the confronting surface of the fuselage. By unfurling the sheet during a "deep stall" condition, the downward vertical velocity of the aircraft may be appreciably diminished.

3 Claims, 1 Drawing Sheet

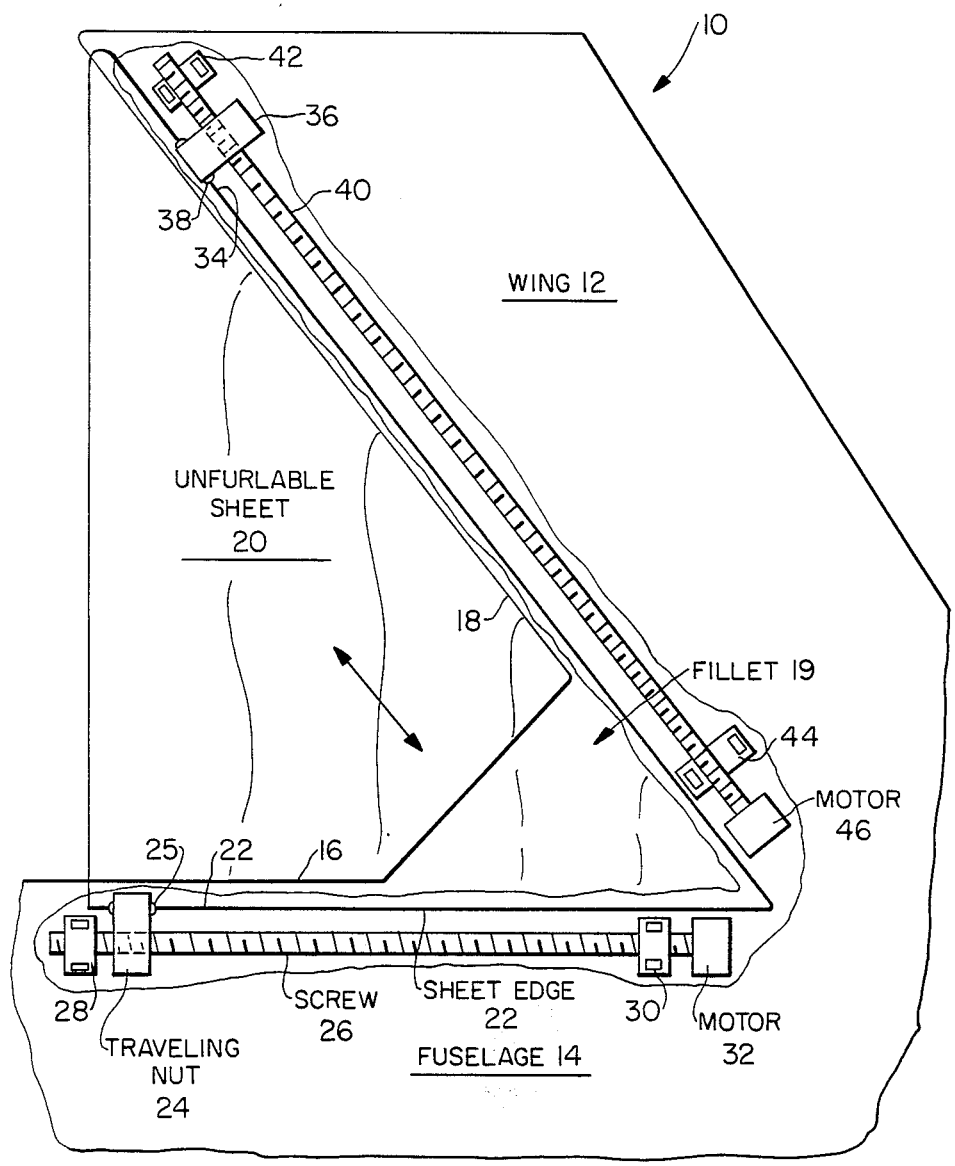

UNFURLABLE MEMBER FOR INCREASING WING SURFACE AREA

FIELD OF THE INVENTION

The present invention relates to extendable wing structures, and more particularly to a compact fabric structure which may be selectively unfurled to increase the wing surface area of an aircraft.

BACKGROUND OF THE INVENTION

In recent years, aircraft have been maneuvered in what has become known as a "deep stall" condition which effectively stops the forward velocity of an aircraft while maintaining its attitude in a controlled position. One researcher, Dale Reed of NASA Dryden Flight Research Center, has demonstrated the utilization of "deep stall" by moving horizontal stabilizers (or canards) of an aircraft into a 70° nose down attitude just as the aircraft is flown down to a stall speed. This researcher determined that, if the aircraft is moved rapidly from the 18° angle of attack normal stall to about 28°, the aircraft does not have sufficient time to roll off onto one wing. The aircraft subsequently falls downward in a horizontal attitude, under complete control of a downward deflected horizontal stabilizer which is not stalled. The capability of controlling the forward velocity of an aircraft by entering a "deep stall" condition has many uses. One use is the safe landing of long endurance unmanned aircraft (drones). Other uses are relevant to my co-pending patent applications Ser. Nos. 855,285, and 855,303. In these latter-mentioned patent applications, a system for generating an upward air column is disclosed for cooperating with an aircraft that is capable of entering a "deep stall" condition at the top of the air column, thereby becoming captured by the air column. By controlling the pressure of the air column, the aircraft may be gently lowered or raised from a preselected landing area. It would be highly desirable with aircraft to be operated in a "deep stall" condition to have the capability of selectively increasing the surface area of the aircraft wings so that descent of the aircraft can be assisted by the aircraft.

BRIEF DESCRIPTION OF THE PRIOR ART

The prior art includes various structures for selectively extending the surface area of an aircraft wing, albeit for reasons completely different than assisting "deep stall" maneuvering.

U.S. Pat. Nos. 4,090,684 and 4,106,727 disclose hinged aircraft wing segments which are pivotally mounted with respect to an aircraft fuselage which permits the aircraft to be stored in a compact package prior to being deployed.

U.S. Pat. No. 2,376,636 illustrates a retractable auxiliary wing for airplanes which is normally retracted within the fuselage of the aircraft but which may be moved to a coextensive relationship with the wing of the aircraft. The latter-mentioned aircraft is designed to provide ample lifting power at take-off with heavy loads and for trimming of the wing area after the plane has gained altitude and speed to increase its velocity and range, and for increasing the wing area for landing to reduce the length of a landing field required and to reduce the air speed for landing.

Although the previously described patents do provide means for increasing the surface area of the wing, the mechanisms disclosed therein are quite complex and also add weight that is unnecessary for the purposes of the present invention and which would detract from the performance capabilities of aircraft for which the present invention is directed.

SUMMARY OF THE PRESENT INVENTION

Wing loading is of the utmost importance for an aircaft in executing a low vertical velocity landing. To obtain a low vertical velocity landing, the wing loading must be decreased. In order to decrease the wing loading, the surface area of the wings must be increased.

The present invention provides a simple, yet elegant, means for selectively increasing the surface area of aircraft wings, sufficient to assist in controlled descent of an aircraft during a "deep stall" condition. The present invention utilizes a lightweight sheet material that is normally contained within the fillet of an aircraft, located in a triangular corner adjacent the junction of the wing and the aircraft fuselage. Upon deployment, the edges of a generally triangular-shaped sheet travel along oppositely positioned tracks in the wing and fuselage thereby creating a web which is coextensive with the wing.

By utilizing a simply constructed mechanism, a sheet can be quickly unfurled to quickly increase the surface area of the wing during "deep stall." Thereafter, the sheet may be retracted and again stored within the aircraft fillet so that it does not interfere with optimum performance of the aircraft.

The above-mentioned objects and advantages of the present invention will be more clearly understood when considered in conjunction with the accompanying drawing, in which:

BRIEF DESCRIPTION OF THE FIGURE

The figure is a top plan cut-away view of an aircraft wing and adjacent fuselage structure illustrating the invention in a deployed condition.

DETAILED DESCRIPTION OF THE PRESENT INVENTION

Referring to the drawing, an unfurled sheet is indicated in a deployed condition on a forward swept wing. The present invention will operate more advantageously on a forward swept wing structure because it does not stall at the wing tips as does aft swept wings. Therefore, aileron control is maintained at a more acceptable level thereby resulting in full roll control during vertical flight. Althought the present invention will operate for aft swept wings, roll control will not be as acceptable.

A portion of an aircraft generally indicated by reference numeral 10 includes wing 12 and fuselage 14. An acute angular corner is formed between fuselage 14 and edge 18 of wing 12, and a fillet 19 is located at the corner. The customary purpose for fillet 19 is to enhance the airfoil of the aircraft in the vicinity of the wing-fuselage junction. Fillet 19 is hollow and forms a receiving pocket for the unfurlable sheet 20 when the sheet is in the stored condition. However, upon selected displacement of the sheet, it will unfurl to form a right angle plane between wing 12 and fuselage 14 thereby increasing the surface area of wing 12 upon deployment of the sheet.

A number of means may be employed to unfurl sheet 20. A pyrotechnic actuator, such as used in various aircraft structures, may be employed. Alternately, a mechanical mechanism such as that shown in the figure may be used. However, it is to be emphasized that the particular means for unfurling the sheet 20 is non-critical and a number of alternatives would be obvious to those skilled in the art. The actuating mechanism to be discussed in detail is comprised of two driven screws for moving traveling nuts outwardly from fillet 19. The nuts are attached to the sheet 20 thereby unfurling the sheet as the screws are driven.

In greater detail, the lower (base) edge 22 of triangular sheet 20 is seen to be received within a slot 16 formed in fuselage 14. Edge 22 is attached at 25 to traveling nut 24. The traveling nut 24 moves longitudinally along screw 26, the latter being positioned in space parallel relationship with sheet edge 22. The outward ends of screw 26 are secured within journals 28 and 30. The screw is rotated by means of a selectively controlled motor 32.

The opposite (hypotenuse) edge 34 of the right triangular-shaped sheet 20 is received within a slot formed along the forward edge 18 of wing 12. A second traveling nut 36 is provided for attachment at 38 to edge 34 of the sheet. The traveling nut 36 travels along the length of screw 40 which is driven by motor 46. Journals 42 and 44 secure outward ends of screw 40.

In operation of the device, motors 32 and 46 are simultaneously energized to unfurl sheet 20 from its stored condition within fillet 19 to its unfurled condition. This occurs after screws 26 and 40 cause respective traveling nuts 24 and 36 to move outwardly from fillet 19 until sheet 20 is fully deployed.

Although a single sheet and wing are shown in the figure, it is to be understood that a sheet is used for each wing of an aircraft.

In accordance with the intention of the invention, deployment of sheet 20 will occur when an aircraft enters a "deep stall" condition, occurring when the horizontal stabilizers of an aircraft are turned vertically downward. Once the "deep stall" condition is properly obtained, an aircraft will maintain a horizontal attitude; and upon deployment of the unfurlable sheet, an aircraft in the "deep stall" condition will obtain a lower vertical velocity for landing.

The unfurlable sheet 20 can be rather thin due to the fact that it is only deployed when an aircraft has a low airspeed, as is the case in a "deep stall" condition. It is anticipated that canvas or lightweight synthetics may be used.

As will be appreciated from the above invention, lightweight and simple, reliable means are offered for selectively increasing the surface area of aircraft wings, particularly when an aircraft is traveling at low airspeeds in preparation of landing during a "deep stall" condition.

It should be understood that the invention is not limited to the exact details of construction shown and described herein, for obvious modifications will occur to persons skilled in the art.

I claim:

1. An aircraft structure for selectively increasing the wing surface area of an aircraft, the structure comprising:
   a hollowed fillet located at the corner formed between a fuselage and a confronting edge of the wing for enhancing the airfoil of the aircraft in the corner;
   wherein the wings are fixed to the fuselage at a fixed sweep angle to define the corner;
   an unfurlable sheet of flexible material normally stored within the fillet; and
   means located substantially entirely within the aircraft for unfurling the sheet from the fillet to a deployed position substantially coplanar with the wing.

2. The structure set forth in claim 1 wherein the fuselage and confronting wing edge have elongated slots formed therein for receiving hypotenuse and base edges of a right triangular unfurled sheet, a third edge of the sheet extending between the tip portion of the wing and the fuselage.

3. An aircraft structure for selectively increasing the wing surface area of an aircraft, the structure comprising:
   a hollowed fillet located at the corner formed between a fuselage and a confronting edge of the wing for enhancing the airfoil of the aircraft in the corner;
   an unfurlable sheet of flexible material normally stored within the fillet; and
   means located substantially entirely within the aircraft for unfurling the sheet from the fillet to a deployed position substantially coplanar with the wing;
   wherein the wings are fixed to the fuselage at a fixed sweep angle to define the corner; and
   further wherein the fuselage and confronting wing edge have elongated slots formed therein for receiving hypotenuse and base edges of a right triangular unfurled sheet, a third edge of the sheet extending between the top portion of the wing and the fuselage.

* * * * *

UNITED STATES PATENT AND TRADEMARK OFFICE
CERTIFICATE OF CORRECTION

PATENT NO. : 4,744,534

DATED : May 17, 1988

INVENTOR(S) : Marshall J. Corbett

It is certified that error appears in the above-identified patent and that said Letters Patent is hereby corrected as shown below:

Column 2, bridging lines 7 and 8, change "aircaft" to --aircraft--.

Column 2, bridging lines 48 and 49, change "accceptable" to --acceptable--.

Column 2, line 50, change "Althought" to --Although--.

Column 2, line 61, change "the" to --a--.

Signed and Sealed this

Eleventh Day of October, 1988

*Attest:*

DONALD J. QUIGG

*Attesting Officer*   *Commissioner of Patents and Trademarks*